Nov. 5, 1940.    R. D. HULSLANDER    2,220,404
BALANCING APPARATUS
Filed April 7, 1939    7 Sheets-Sheet 2

INVENTOR
RAY D. HULSLANDER
BY
ATTORNEYS

Nov. 5, 1940. R. D. HULSLANDER 2,220,404
BALANCING APPARATUS
Filed April 7, 1939 7 Sheets-Sheet 4

INVENTOR
RAY D. HULSLANDER

ATTORNEYS

Nov. 5, 1940.  R. D. HULSLANDER  2,220,404
BALANCING APPARATUS
Filed April 7, 1939  7 Sheets-Sheet 5

INVENTOR
RAY D. HULSLANDER
BY Ely & Frye
ATTORNEYS

Nov. 5, 1940.    R. D. HULSLANDER    2,220,404
BALANCING APPARATUS
Filed April 7, 1939    7 Sheets-Sheet 7

INVENTOR
RAY D. HULSLANDER

BY

ATTORNEYS

Patented Nov. 5, 1940

2,220,404

UNITED STATES PATENT OFFICE 2,220,404

BALANCING APPARATUS

Ray D. Hulslander, Akron, Ohio, assignor to The Firestone Tire & Rubber Company, Akron, Ohio, a corporation of Ohio Application April 7, 1939, Serial No. 266,553

11 Claims. (Cl. 73—53)

This invention relates to balancing apparatus, and more especially relates to apparatus for balancing annular articles, such as pneumatic vehicle tires, to determine the location of unbalance therein, and the magnitude of such unbalance.

The invention is an improvement upon a tire balancing machine of known construction that is marketed under the trade name "Micropoise," said machine requiring manual operation to secure the tire on the balancing head, and for moving the latter to operative, tire-balancing position. The present improvement consists in the provision of mechanical means for accomplishing the aforesaid manual operation.

The chief objects of the invention are to save time for the operator, which time may be usefully employed in other operations; and to make the operator's duties less laborious. Other objects will be manifest as the description proceeds.

Figure 1:
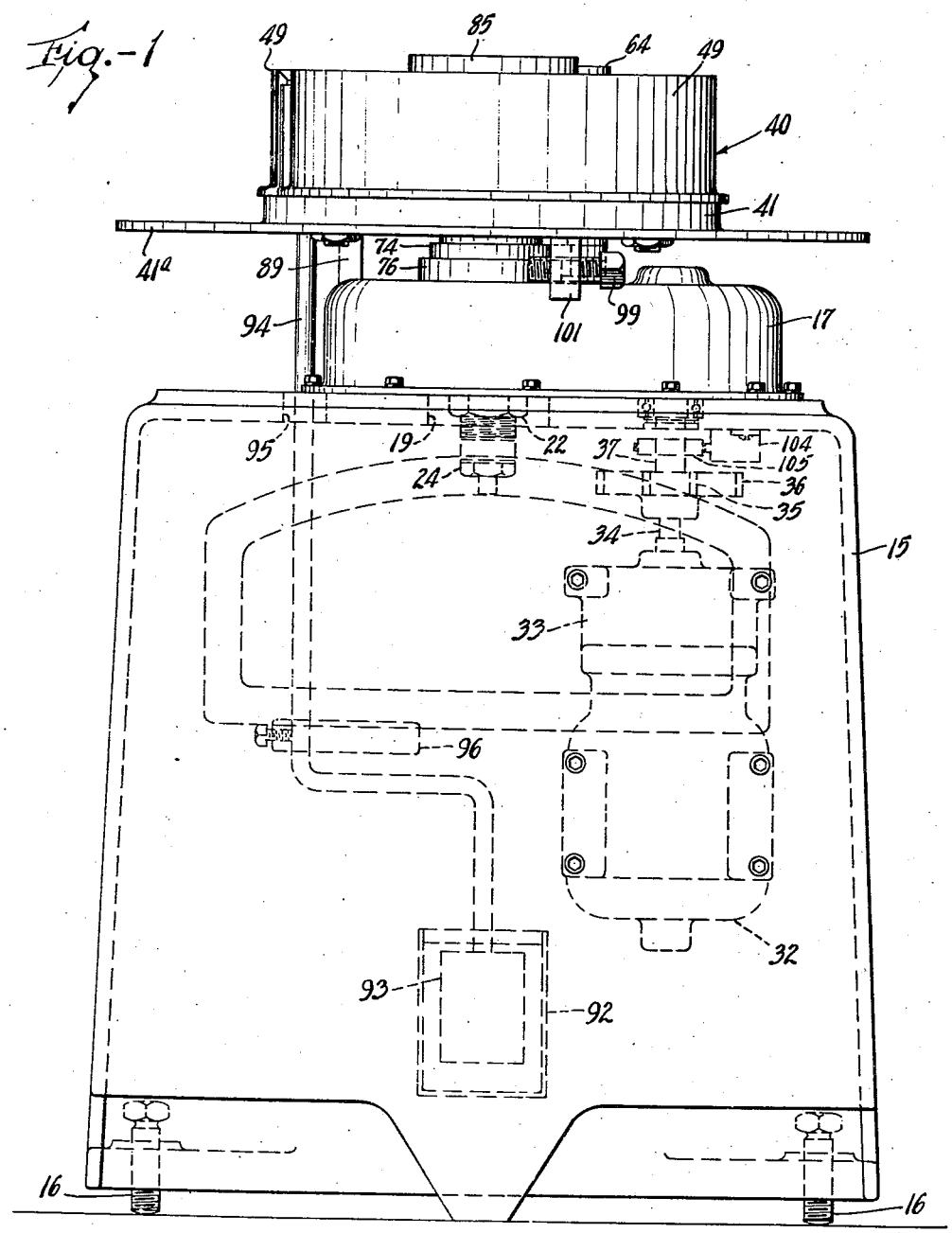
Figure 1 is a rear elevation of apparatus embodying the invention, in inoperative position.
Figure 2:
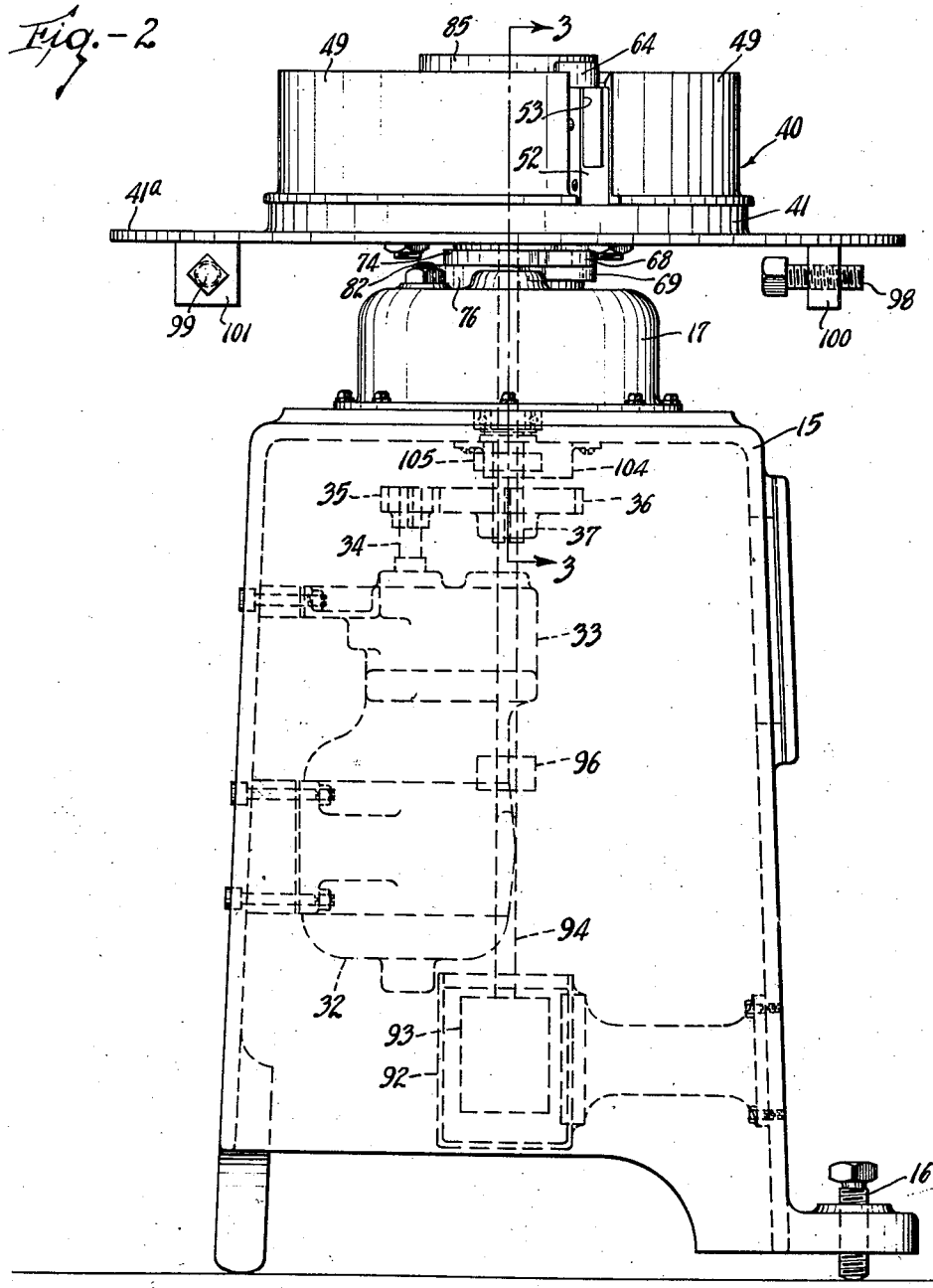
Figure 2 is a side elevation thereof as viewed from the right of Figure 1.

Referring to the drawings, the illustrative embodiment of the apparatus shown comprises a housing 15 that has three-point support upon the floor or other suitable base, two of its points of support consisting of adjusting screws 16, 16 by means of which the apparatus is maintained in level position, with its axis exactly vertical. Mounted upon the top of the housing 15 is a metal shell or enclosure member 17 that constitutes a gear case for gearing presently to be described.

Figure 8:
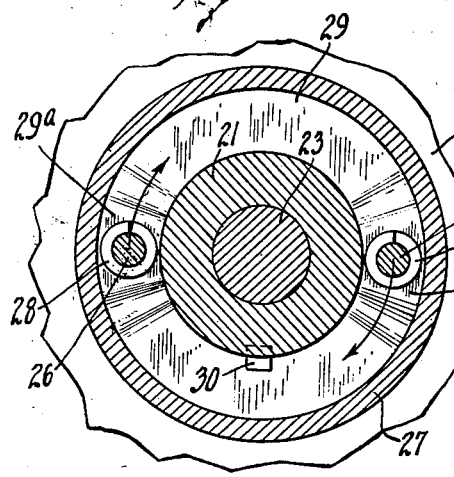
Figure 8 is a section on the line 8—8 of Figure 3.
Figure 9:
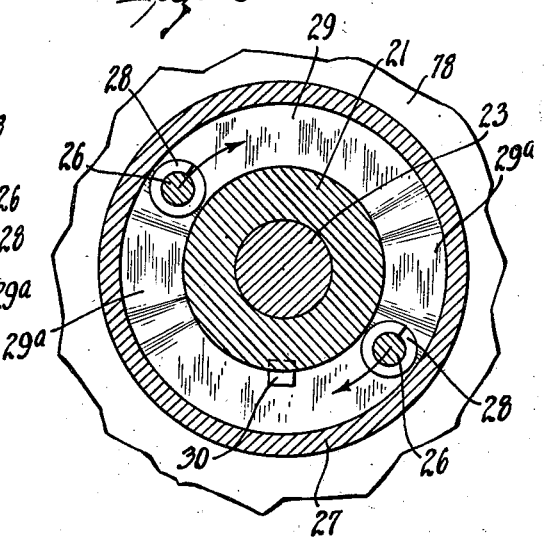
Figure 9 is a section on the line 9—9 of Figure 4.
Figure 10:
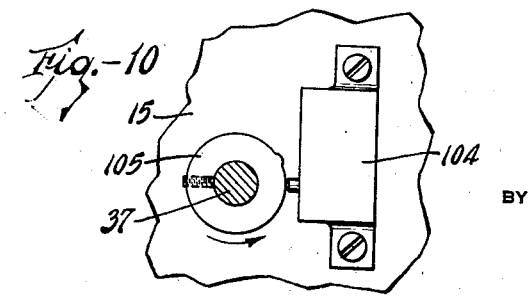
Figure 10 is a section on the line 10—10 of Figure 3 showing a limit switch and its operating cam in elevation.

The top wall of the housing 15 is centrally apertured at 19, and mounted atop of said wall, within the gear case 17, is a heavy, flat, bearing plate 20 that is formed with an aperture concentric with aperture 19 but smaller than the latter. Supported upon the plate 20 is an upstanding vertical quill 21 that has a reduced lower end portion extending through the aperture in said plate, a nut 22 threaded onto said reduced portion of the quill being provided for securing the latter non-rotatably to said plate. Mounted within the quill 21 is a spindle 23 that projects somewhat above the top of the quill, and also projects below the quill where a nut 24 screws it to the quill. Journaled upon the quill 21, with its hub resting upon the bearing plate 20, is a gear 25, the hub of said gear, on its top side, being provided with a pair of upstanding headed studs 26, 26, and a peripheral upstanding flange 27 that is concentric with the axis of the gear and which encircles said studs. Each of said studs has a spring washer 28, Figures 8 and 9, beneath its head, to provide a modicum of axial resilience to the stud. Slidably mounted for axial movement upon the quill 21 is a sleeve 29 that is secured against angular movement relatively of the quill by means of a key 30. The lower end portion of the sleeve 29 is slidably received within and guided by the flange 27 of gear 25, the end face of said sleeve being locally formed at two diametrically opposite regions with protruding, flat-topped cam surfaces 29a, 29a. The arrangement is such that the gear 25 rotates relatively of the sleeve 29 so that the studs 26 periodically pass under the cam surfaces 29a, with the result that the said sleeve periodically is raised and lowered. The flat-topped cams 29a provide a dwell in the movement of sleeve 29 as gear 25 rotates, carrying studs 26 over the flat-topped surface of cams 29a. Because there are two such studs and cam surfaces, the raising and lowering of the sleeve occurs twice during each revolution of the gear 25.

Power for rotating the gear 25 is furnished by an electric motor 32 that is mounted upon a vertical axis interiorly of the housing 15, upon the rear wall thereof. Operatively associated with the motor 32 is a reduction gear device 33, the power-delivery shaft 34 of which carries a relatively small gear 35. The latter is meshed with a larger gear 36 mounted upon the lower end portion of a vertical countershaft 37 that is journaled in the top wall of housing 15 and the top wall of crank case 17. Within the gear-case countershaft 37 carries a gear 38 that meshes with gear 25, said gear 38 being one-half the pitch diameter of gear 25 so that a 2 to 1 speed reduction is effected therebetween.

Figure 3:
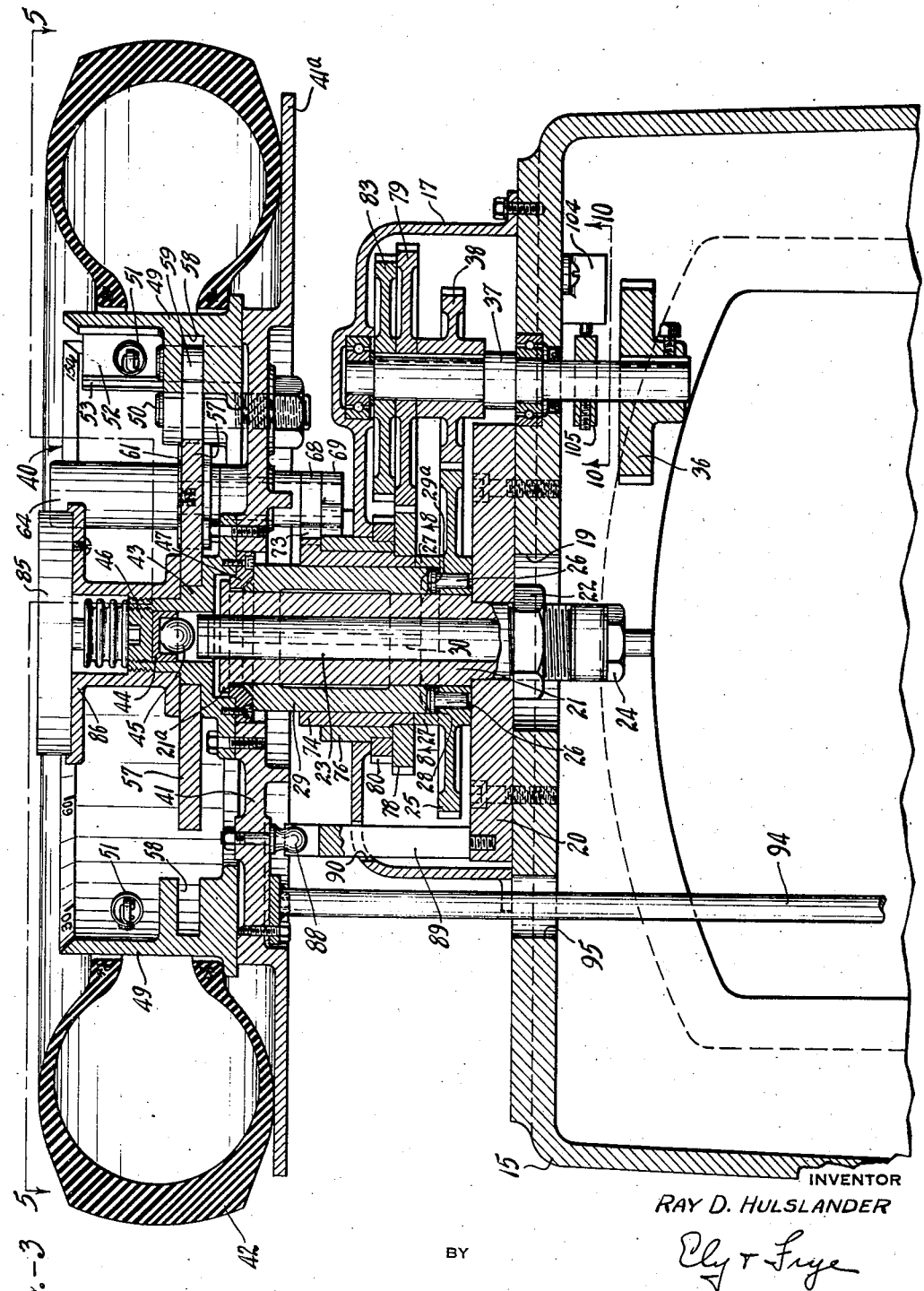
Figure 3 is a section, on a larger scale, on the line 3—3 of Figure 2 and Figure 5, and a pneumatic tube to be balanced mounted thereon.

The raising and lowering of the sleeve 29 as previously described is for the purpose of raising and lowering the balancing head of the apparatus that carries the tire to be tested, said balancing head in its lowered position being supported upon the spindle 23 and capable of universal oscillatory movement thereon. The balancing head of the apparatus is generally designated 40. It comprises an annular, horizontally disposed base plate 41 that is formed with a wide, concentric, offset peripheral flange 41a that is disposed parallel to the plane of the plate and constitutes a work-seat upon which a pneumatic tire casing 42 may rest. The medial opening in the plate 41 is somewhat larger than the outside diameter of the sleeve 29. Mounted atop of the plate 41, at the middle thereof, is a concentrically disposed annular cap member 43 that overlies the upper ends of the sleeve 29 and quill 21, the upper end portion of spindle 23 being received in the axial opening of the cap, said opening being of such size as to provide ample clearance about the spindle. Slidably mounted in the axial opening of the cap member 43 is a downwardly opening cup 44 in which a hardened spherical ball 45 is retained with a force fit, said ball resting upon the upper end of spindle 23 in the lowered position of the balancing head and constituting a universal axis of oscillation for said head. A plug 46 threaded into the upper end of the bore of cap member 43 retains cup 44 therein and provides means for varying the axial position of said cup, and the ball 45 retained therein. Mounted upon the bottom of the cap member 43, within the axial aperture of the plate 41, is a seating ring 47 that encircles the quill 21, concentrically therewith, above the upper end of sleeve 29, the upper end of said quill 21 being formed with a radial flange 21a that extends over the top of said seating ring. The upper end of sleeve 29 and the lower inner corner of the seating ring 47 are complementally beveled so as to be capable of interfitting during intervals when the sleeve 29 is in elevated position, as shown in Figure 3, in the inoperative position of the apparatus. During such intervals the ball 45 is lifted clear of the spindle 23, and the seating ring 47 is urged against the under side of quill flange 21a, with the result that the balancing head positively is restrained against movement. It is during the intervals that the balancing head is in elevated position that a tested tire is removed therefrom and replaced by a tire to be tested.

Figure 5:
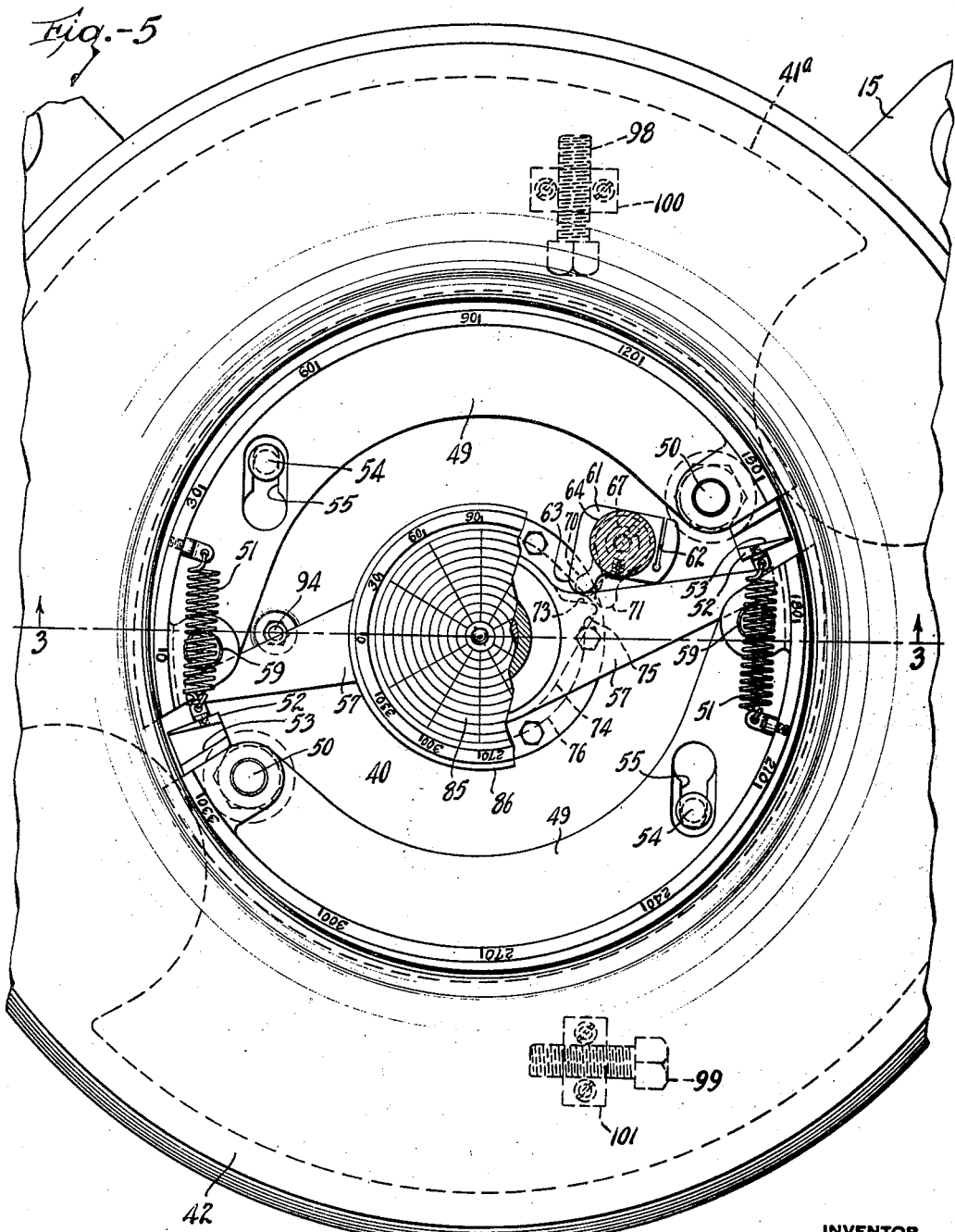
Figure 5 is a section, on a larger scale, on the line 5—5 of Figure 3.
Figure 6:
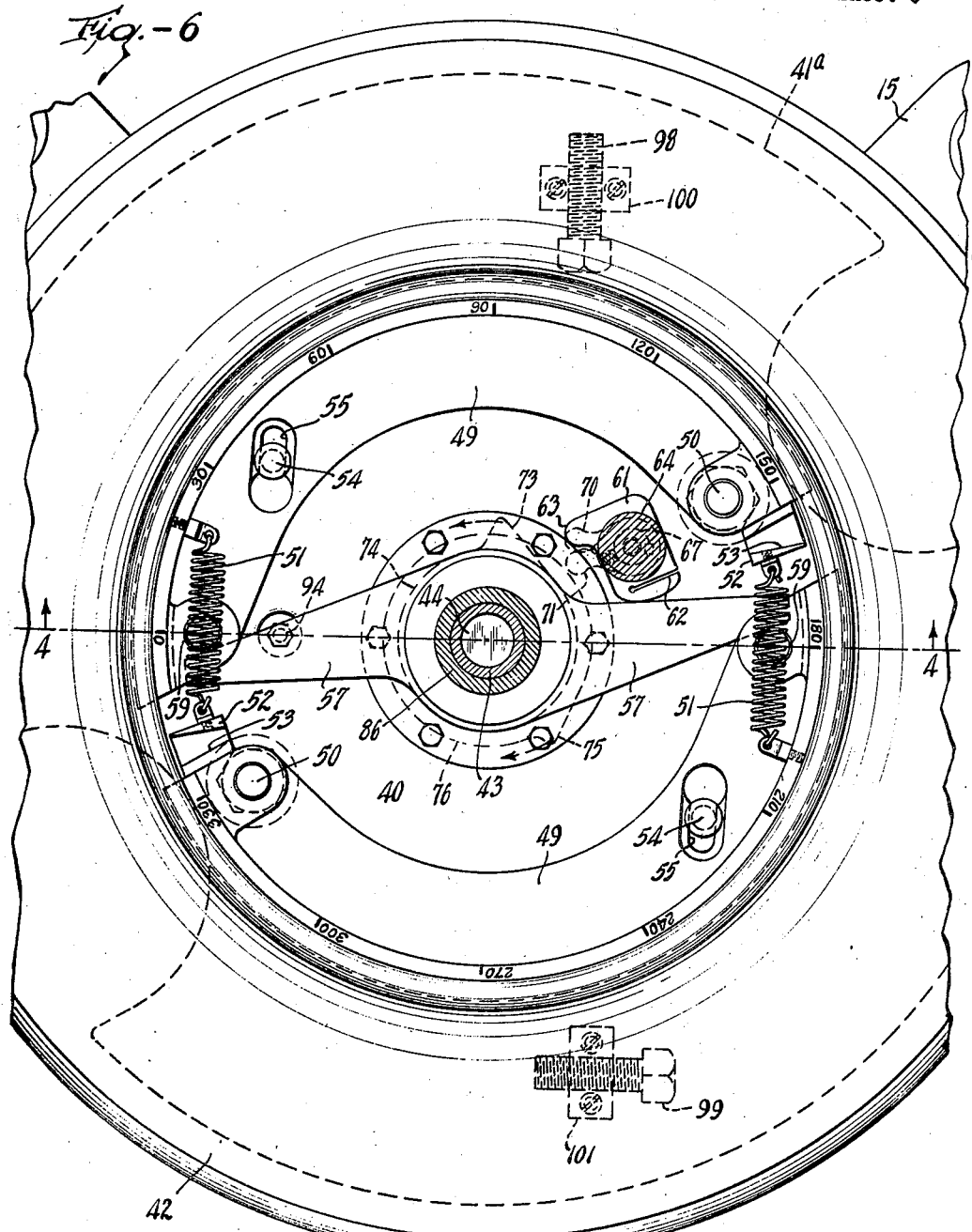
Figure 6 is a section, on a larger scale, on the line 6—6 of Figure 4.

In addition to those elements described, the balancing head 40 also comprises mechanically operated means for exactly centering the tire 42 thereon, said means engaging the tire, and subsequently releasing the same, automatically in determinate time relation to the raising and lowering of the balancing head. As is best shown in Figures 5 and 6, the tire-centering means comprises an expansible chuck consisting of a pair of arcuate shoes 49, 49 that rest upon edge upon the top face of the plate 41, said shoes being pivoted at one end upon respective pivot pins 50, the latter being disposed 180° apart. The outside radius of each shoe 49 is substantially the same as the radius of the tire 42 at the beads thereof, whereby said shoes may engage the inside circumference of the tire without deforming the same. The shoes 49 are so arranged that the free end of each shoe is disposed adjacent the pivoted end of the other shoe, and each shoe is of less than 180° extent so that there is a space between the adjacent ends of the shoes. The free end of each shoe 49 normally is drawn inwardly, away from the tire 42, by a tension spring 51 that is connected at one end to the free end of a shoe, and at its other end is connected to a rearward extension 52 formed on the pivoted end of the adjacent shoe 49. Each of said shoe-extensions 52 is formed with a transverse slot 53 extending downwardly from the top thereof, which slot accommodates the valve stem of an inner tube in cases where the tire 42 is balanced after an inner tube has been mounted therein. For holding the shoes 49 to the plate 41 so that they will not be lifted when a tire 42 is being removed from the balancing head, headed studs 54 are mounted upon the upper face of the plate 41 and extend through respective slots 55 formed in the shoes 49. Slots 55 are enlarged at one end so as to pass over the heads of studs 54, upon occasion, when it is desired to remove the shoes.

For expanding the chuck, that is, for swinging the free ends of the shoes outwardly against the tension of springs 51, to cause said shoes to engage a tire 42, a two-arm lever 57 is provided, said lever being fulcrumed upon the cap member 43 and capable of angular movement thereabout. The two arms of the lever 57 extend radially outwardly therefrom, and the free end of each shoe 49 is slotted at 58 to receive the free end of one of the lever arms. A hardened metal pin 59 traverses each slot 58 and constitutes a wear-member against which the lever arm may operate. The arrangement is such that when the lever 57 is turned angularly, in clockwise direction as viewed in Figures 5 and 6, the shoes 49 will be swung outwardly about their respective pivots 50.

For moving the lever 57 angularly as described, a cam plate 61 is provided, which plate is angularly movable about an axis to cause an arcuate cam surface to operate against one of the arms of the lever 57 and thereby to effect angular movement of the latter. The cam plate 61 is slotted at 62 adjacent its cam surface to impart a modicum of resilience thereto. The cam plate 61 is shown in inoperative position in Figure 5 and in operative position in Figure 6. In addition to its cam surface, the cam plate 61 is formed with a laterally projecting lug 63 that also engages the lever 57 in the inoperative position of the cam, as shown in Figure 5, to limit the movement of said lever toward the axis of the cam under the impetus of springs 51. Mounted atop of the cam plate 61 is a weight 64 that serves to counterbalance some of the dead weight on the opposite side of the balancing head as subsequently will be explained.

Angular movement of the cam plate 61 is effected by means of a vertical shaft 67 upon the upper end of which said cam plate is mounted, said shaft being suitably journaled in the base plate 41 of the balancing head. Mounted upon the lower end of shaft 67, below the balancing head, are collars 68, 69 respectively, which collars are formed with respective radially extending lugs 70, 71. The collars 68, 69 are so mounted upon shaft 67 that lugs 70, 71 are disposed at an angle to each other. One or the other of the lugs 70, 71 always extends into the orbit of a cam, which cam acting thereon turns the shaft 67 angularly to move the other lug into the orbit of another cam, the latter cam moving in the opposite direction to the movement of the first-mentioned cam. The cam that engages lug 70 is designated 73, and is locally formed on the upper end of a sleeve 74 that is mounted upon the sleeve 29, concentrically thereof, and rotatable thereabout. The cam that operates lug 71 is designated 75, and is locally formed upon the upper end of a sleeve 76 that is mounted upon sleeve 74, concentrically thereof, and rotatable thereabout.

Figure 7:
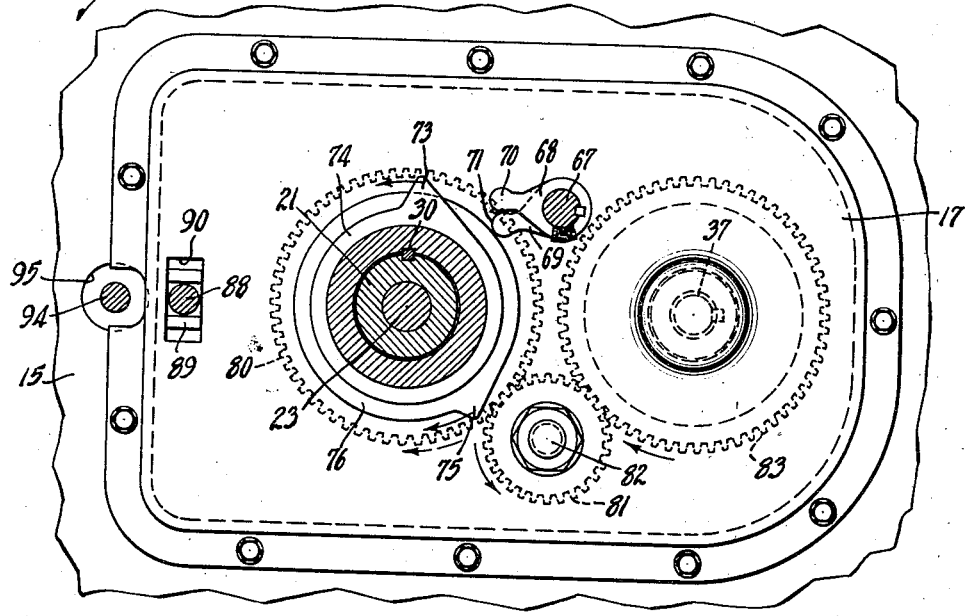
Figure 7 is a section on the line 7—7 of Figure 4.

For rotating the sleeve 74 and cam 73 thereon, the lower end of said sleeve has a gear 78 mounted thereon, which gear is meshed with a gear 79 of equal size that is mounted on countershaft 37. For rotating the sleeve 76 and cam 75 thereon, the lower end of the sleeve, which is immediately above gear 78, has a gear 80 mounted thereon, which gear is meshed with an idler pinion 81, Figure 7, that is journaled on a stub shaft 82 mounted upon the top wall of gear case 17. The pinion 81 is meshed with a gear 83 that is mounted upon countershaft 37, directly above gear 79. Gears 80, 83 are of the same size so that there is no speed change therebetween. The arrangement is such that cams 73, 75 rotate at the same angular speed, but in opposite directions as indicated by the arrows in Figure 7. The lugs 70, 71 are shown in said figure as they appear immediately after cam 73 has engaged and moved lug 70, which operation turns cam 61 to the operative position shown in Figure 6. Upon continued operation of the apparatus, the cam 75 will engage and move lug 71 to the position shown in broken lines in Figure 5, which operation turns the cam 61 to the inoperative position shown in said figure. The studs 26 of gear 25 and the cam elevations 29a of sleeve 29 are 180° apart, but since gear 25 has an angular speed of but half that of gears 78, 80 it will be seen that the balancing head will be raised and lowered but once for each operative cycle of the cam 61. The cams 29a, 73 and 75 are so disposed with relation to each other that the turning of cam 61 to effect the opening or expanding of the tire chuck is effected during the interval that the sleeve 29 and balancing head 40 are in raised position during the dwell in movement of sleeve 29, just prior to the movement of head 40 downwardly from inoperative to operative position, and the collapsing of the chuck is likewise effected just after the balancing head has been lifted to inoperative position.

Figure 4:
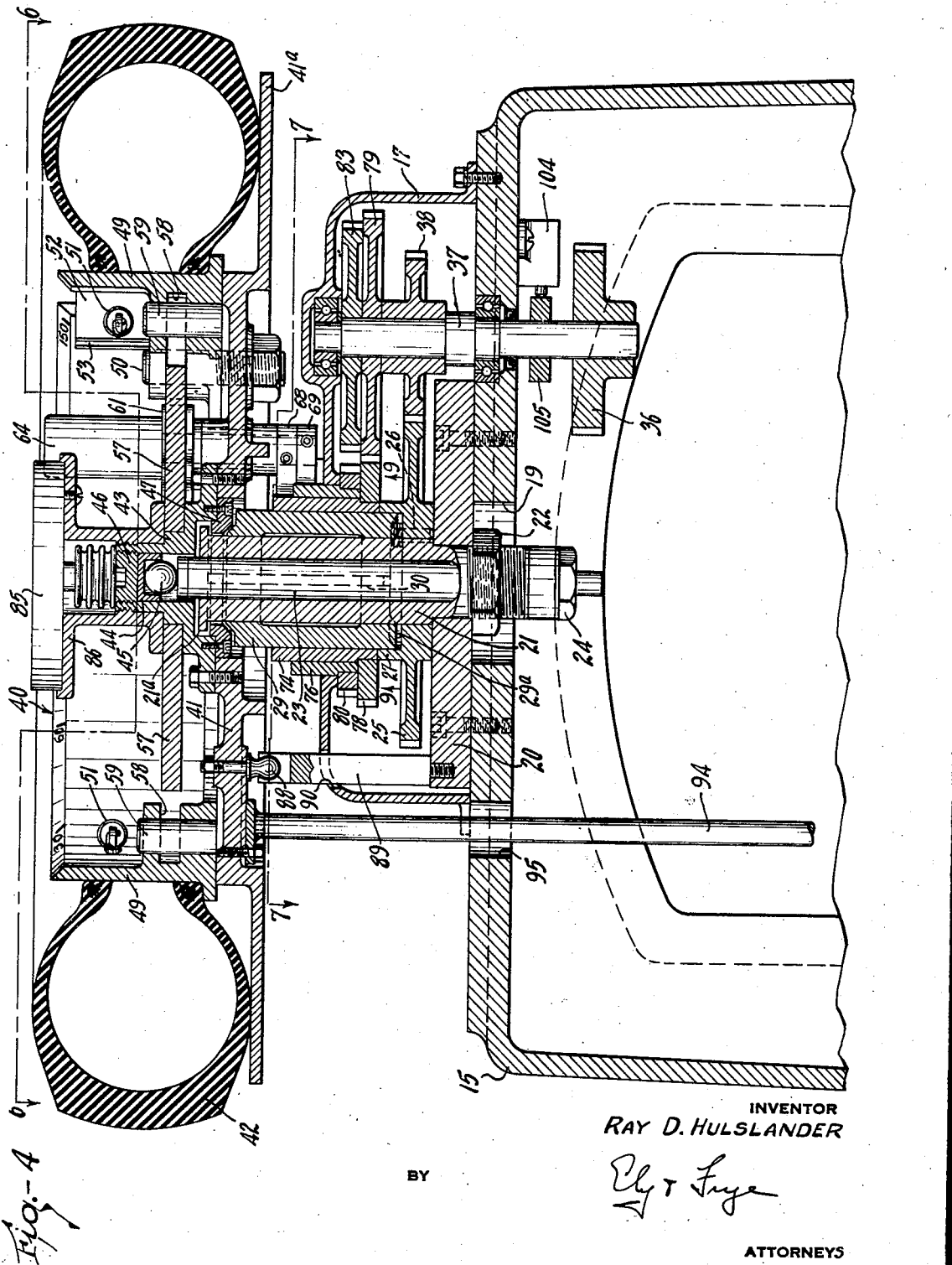
Figure 4 is a section similar to Fig. 3, on the line 4—4 of Figure 6, the various elements thereof being shown in operative, tire-balancing position.

When the balancing head is in its lowered, operative position shown in Figures 4 and 6 any unbalance of the tire will be indicated by a spirit level 85 that is positioned at the axis of the balancing head, said spirit level being mounted upon the top of an annular pedestal support 86 that is threaded onto the upper end of cap member 43. The support 86 is formed with a base flange that overlies the medial region of the two-arm lever 57 and secures the latter to the said cap member. As shown in Figure 5, the spirit level 85 is calibrated radially by degrees, and also by a series of circles concentric with its axis. The upper margin of each shoe 49 also is calibrated by degrees in alignment with the radial markings on the spirit level. Thus during the balancing of a tire, the angular location of the bubble in the spirit level indicates the lightest region of the tire, and the latter may be suitably marked, by the aid of the calibrations on the chuck shoes, at said lightest region. The concentric calibrations of the spirit indicate the extent or quantum of unbalance in the tire, and this quantity also may be noted on the tire so that the tire subsequently may be balanced by the addition of weight thereto, as by means of a weighted valve stem in an inner tube.

It is desirable to prevent any rotary movement of the balancing head 40 about its axis during operation of the apparatus, and to this end a small spherical knob 88 is mounted upon the bottom of the balancing head so as to project downwardly therefrom. Said knob is positioned in the forked upper end portion of a post 89 that is secured to the plate 20 and rises therefrom through an aperture 90 in the crank case 17. The arrangement prevents rotary movement of the balancing head yet enables it to oscillate upon its universal axis of oscillation.

In order that balancing of a tire may be effected quickly during the brief interval that the balancing head is in lowered, operative position it is desirable that oscillations of the head be quickly suppressed and to this end suitable damping means is provided. Said damping means comprises an open top receptacle 92 that is mounted interiorly of the housing 15 in axial alignment with the balancing head. Said receptacle is filled with a heavy non-volatile liquid such as castor oil, and immersed in said liquid is a weight or bob 93 that is suspended from the balancing head 40 by means of a rod 94, the latter of necessity being secured to the head 40 remote from the axis of the latter, and being reversely bent in its medial region. The rod 94 extends through a suitable aperture 95 in the housing 15, and carries a vertically adjustable counterweight 96 that enables the center of gravity of the balancing head to be altered. The rod 94 and bob 93 are so connected to the plate 41 as to be partly counterbalanced by the counterweight 64 previously described. Supplementing the counterweight 64 are adjustable counterweights 98, 99 that enable the balancing head to be brought into perfect balance upon its universal pivot. The counterweights 98, 99 consist of heavy bolts or screws that are threaded through respective brackets 100, 101 mounted upon the bottom face of plate 41, the screw 98 being adjustable in a substantially radial direction and the screw 99 being adjustable at right angles thereto.

From the foregoing description it will be seen that the apparatus performs one cycle of operation for every revolution of the countershaft 37. A manually operable push-button switch (not shown) is provided for setting the motor 32 in operation, but the stopping of the motor is effected automatically by means of a limit switch 104. The latter is mounted upon the top wall of the housing 15, interiorly thereof, and engaged by a cam 105 on the countershaft 37.

By means of the improvements constituting this invention, the operation of the tire-centering chuck is effected automatically in determinate time relation to the raising and lowering of the balancing head, out of and into operative position, the latter operation also being accomplished mechanically. The invention eliminates considerable manual labor heretofore required for the operation of balancing apparatus of this type, and achieves the other advantages set out in the foregoing statement of objects.

Modification may be resorted to without departing from the spirit of the invention, or the scope thereof as defined by the appended claims.

What is claimed is:

1. In balancing apparatus, the combination of a balancing head having different vertical inoperative and operative positions, a work-centering chuck on said balancing head, power operated means for raising and lowering said balancing head, and means automatically operating said chuck in determinate time-relation to the raising and lowering of said balancing head.

2. In balancing apparatus, the combination of a balancing head having an elevated inoperative position and a lowered operative position, an expansible and collapsible work-centering chuck on said balancing head, power operated means for raising and lowering said balancing head, and power operated means for expanding the chuck prior to the descending movement of the balancing head and for collapsing the chuck after the rising movement thereof.

3. In balancing apparatus, the combination of a balancing head having different vertical inoperative and operative positions, a work-centering chuck on said balancing head, a cam movable in one direction for expanding said chuck and movable in the opposite direction to enable same to collapse, power operated means for raising and lowering the balancing head, and means automatically turning said cam in opposite directions in determinate time relation to the raising and lowering of said balancing head.

4. In balancing apparatus, the combination of a balancing head having an elevated inoperative position and a lowered operative position, a work-centering chuck on said balancing head, a cam operatively associated with the chuck and movable in one direction to expand the same and movable in the opposite direction to permit collapse thereof, a shaft upon the upper end of which said cam is mounted, a pair of lugs projecting radially from the lower end of said shaft, reversely moving cams for engaging said lugs, in succession, to turn said shaft angularly in opposite directions to expand and then to enable collapse of the chuck, and power operated means for reversely moving said cams and for raising and lowering the balancing head in determinate time relation.

5. In balancing apparatus, the combination of a balancing head having an elevated inoperative position and a lowered operative position, a vertically movable axially positioned sleeve for raising and lowering said head, a work-centering chuck on said balancing head, means for expanding and collapsing said chuck, said means comprising an angularly movable shaft journaled in the balancing head at a point removed from the axis thereof, a pair of lugs projecting radially from the lower end of said shaft, a pair of cams journaled on said sleeve and rotating in opposite directions and engageable with the respective lugs at determinate time intervals, and power operated means for rotating said cams and for raising and lowering said sleeve.

6. In balancing apparatus, the combination of a balancing head having vertically different operative and inoperative positions, an expansible and collapsible work-centering chuck on said balancing head, a driven shaft, means connecting said shaft to said balancing head to move it from inoperative to operative and back to inoperative position, and means connected to said driven shaft to expand and to enable collapse of said chuck only when said balancing head is in inoperative position.

7. In balancing apparatus, the combination of a balancing head having an elevated inoperative position and a lowered operative position, an expansible and collapsible work-centering chuck on said balancing head, a driven shaft, means associated with said shaft for raising said balancing head to inoperative position and for lowering it to operative position in predetermined sequence, cam means controlled by said shaft for expanding said chuck prior to lowering said balancing head to operative position, and further means for effecting collapse of said chuck after said balancing head is returned to its inoperative position from its operative position, whereby the apparatus is ready to start another operative cycle.

8. In balancing apparatus, the combination of a balancing head having an elevated inoperative position and lowered operative position, an expansible and collapsible work-centering chuck on said balancing head, a driven shaft, means associated with said shaft for raising said blancing head to inoperative position and for lowering it to operative position in determinate sequence, spring means associated with said chuck for urging the same to collapsed position, cam means controlled by said shaft for expanding said chuck prior to lowering said balancing head to operative position, and means controlled by said shaft for changing the position of said cam means after said balancing head is returned to its inoperative position from its operative position to enable said spring means to collapse said chuck.

9. A balancing apparatus comprising a frame, a balancing head, a spindle extending vertically upward from said frame and adapted to carry said balancing head for universal pivoting movement, a sleeve slidably received on said spindle, means associated with said sleeve for lifting said balancing head from said spindle when said sleeve is in its upper position, cam means formed on the lower end of said sleeve, rotatable base means having projections thereon engaging with said cam means whereby said sleeve which normally is in its upper position is moved downward and then upward and said balancing head is moved from locked to universal pivot and back to locked position during a single revolution of said base means power means for rotating said base means, and means automatically disconnecting said power means after a revolution of said base means.

10. A balancing apparatus comprising a frame, a balancing head, a spindle extending vertically upward from said frame and adapted to carry said balancing head for universal pivotal movement, a sleeve slidably received on said spindle for lowering said balancing head onto said spindle and for raising it therefrom, means for controlling the position of said sleeve, a work-centering chuck carried on said balancing head, and means for expanding and collapsing said chuck in determinate time relation to the positioning of said balancing head.

11. A balancing apparatus comprising a frame, a balancing head, a work-centering chuck on said balancing head, a spindle extending vertically upward from said frame and adapted to carry said balancing head for universal pivotal movement, a sleeve slidably received on said spindle for lowering said balancing head onto said spindle and for raising it therefrom to inoperative position means for controlling the position of said sleeve including cam means operatively associated with said sleeve and rotatable relative thereto, lever means for moving said work-centering chuck from collapsed to expanded position, and means connecting said cam means to said lever means whereby said work-centering chuck is expanded only when said balancing head is in inoperative position.

RAY D. HULSLANDER.